W. A. LIGHTHALL.
STEAM ENGINE.
No. 696. Patented Apr. 14, 1838.
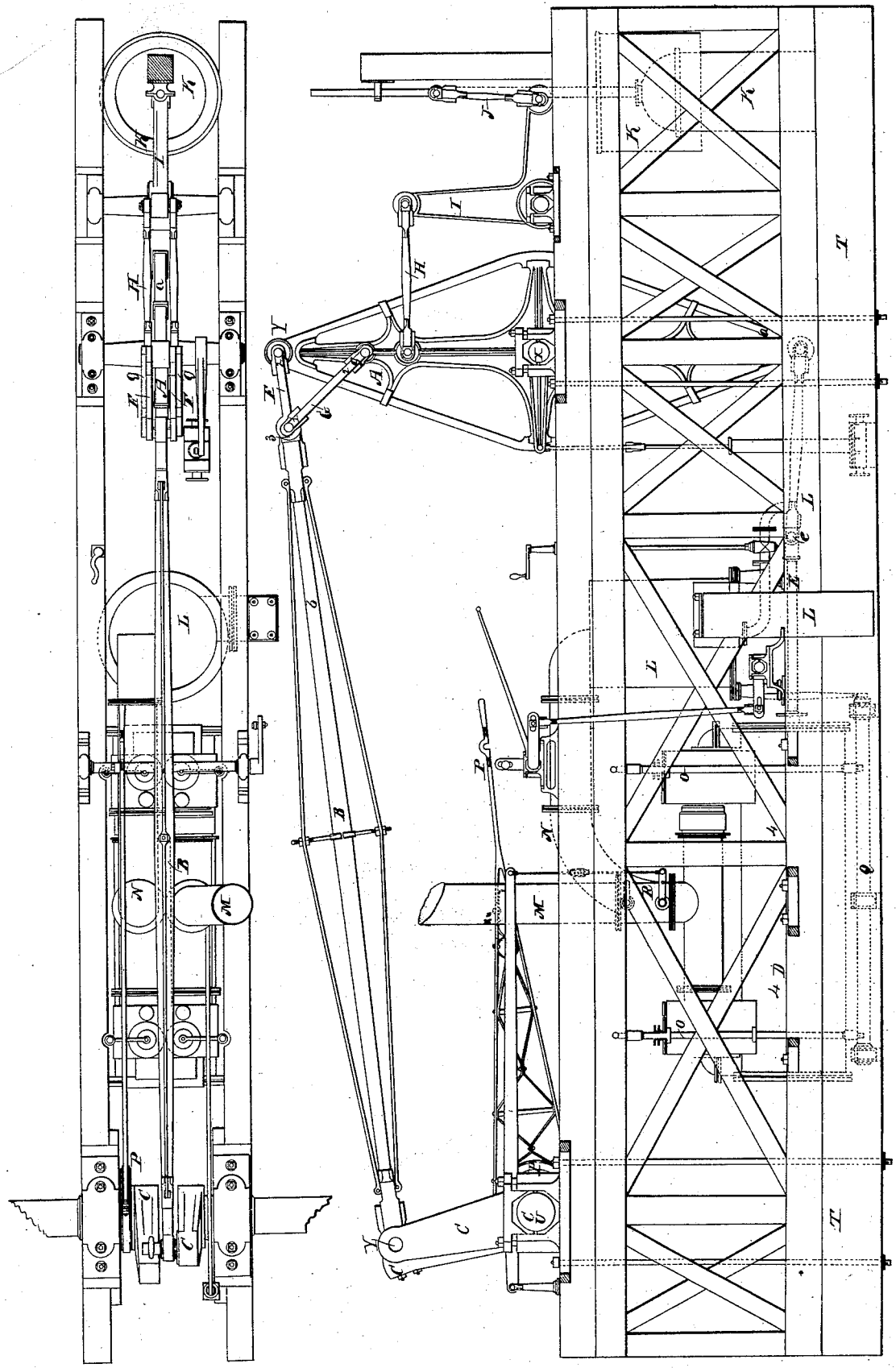

UNITED STATES PATENT OFFICE.

WILLIAM A. LIGHTHALL, OF ALBANY, NEW YORK.

STEAM-ENGINE.

Specification of Letters Patent No. 696, dated April 14, 1838.

*To all whom it may concern:*

Be it known that I, WILLIAM A. LIGHT-HALL, of Albany, New York, have invented or discovered certain new and useful Improvements in Steam-Engines intended for propelling vessels, which combined improvements I designate as "Lighthall's improved horizontal and beam engine," and that I am desirous of obtaining a patent for the said improvements.

The following explanations refer to the drawings 1 and 2 accompanying this specification A *a* the working beam, B *b* the connecting rod, C the crank, and end of the shaft, *c c* the crank, E E the piston rod and link to the lower end of the beam, F the yoke, G *g* the brace to support the yoke, H the connecting rod from the beam to the bell crank of the air pump, I the bell crank for working the air pump, J the connecting rod from the bell crank to the piston of the air pump, K K the air pump and reservoir, L L L the condenser, foot valve, and connection to the air pump, M the steam pipe, N the exhaust pipe to the condenser, O O the valve rods, P the eccentric wheel and rod, *o* the rock shaft for working the valves, R R the cut off valve, T T the keelson or keelsons, E *e* the piston rod, U the center of crank motion, X the center or fulcrum of the beam, Y the pin or journal of the connecting rod, 1, 2, the yoke, 3 the point of coupling with the connecting rod, 4 4 the cylinder.

The following being a description of the aforesaid improvements will be more clearly understood by referring to the drafts or drawings herewith submitted. To obviate many serious inconveniences and existing defects in the present form and disposition of the steam engines now in use, I have combined the leading characteristics of the beam engine, with those of the horizontal engine, in order to embrace the advantages of both and avoid the defects of either, and I accomplish this object in the following manner. I lay the cylinder (or cylinders if a double power be required) horizontally on or upon the keelson T T, and place the working beam A *a* at the proper distance in a vertical position, with its lower end *a* at such a height as to range with the piston rod E *e* in the same manner as when the working beam is horizontal and the cylinder erect. If the length of the working beam when thus vertically placed corresponds with the height of the shaft C and the center of crank motion U then the arrangement is completed, and the desired effect produced. But if the size of the wheel and other circumstances require the shaft to be placed lower than on a horizontal level with the upper end of the working beam, I then bend or incline the upper half or arm of the working beam to such an inclination or angle that a line drawn from the center or fulcrum X of the working beam, to that point where the central line of the connecting rod would intersect it shall be at right angles to a line drawn from the center of the shaft U to the said point of intersection and consequently to the center of crank motion; or in other words if a line be drawn from center U of the shaft, to the center of the pin or journal Y of the connecting rod in the working beam, then a line drawn from the center or fulcrum X of the beam, intersecting at right angles the former line will give the requisite bend of the beam or the necessary deviation from its vertical and rectilinear direction, with sufficient accuracy for all practical purposes.

The proper bend or inclination of the working beam and the requisite length of "yoke" hereafter specified (*i. e.*, the proper positional relation between the center of beam vibration and the center of crank motion) can be obtained by other methods or rules equally well known as that which I have adopted.

But as in this case considerable accuracy would be required to make the angle of the working beam to correspond exactly with the height of the shaft, and it may be necessary and even preferable to use a straight working beam already on hand. I then apply to the beam a "yoke" 1, 2 which is or may be the segment of a circle, of which the upper arm of the working beam X Y is the radius, and of such length as to remove the point 3 of its coupling with the connecting rod B *b* so many degrees forward as it would otherwise be necessary to bend the working beam. This "yoke" may be attached to any working beam in a vertical position and will be the same in effect as though the working beam itself were bent to the angle required.

To secure the "yoke" in its place a strong brace G *g* is attached from the upper arm of the working beam, say about the center of its length to the forward end of the yoke near the point 3 of its coupling with the connecting rod which brace will give in all cases the necessary firmness. Thus it will be seen that the yoke is a substitute for the curved, bent or deflected beam, and the "yoke" as applied to the beam might be carried out to its full extent and thus the working beam would become a circle or wheel in which the greatest levity would be obtained with the greatest strength.

It will appear that by the improvement above specified, "the yoke" that the cylinder may in all cases be laid horizontally upon the keelson or keelsons placing it and all the other machinery so low that its weight instead of being as it now is a necessary and unavoidable incumbrance will act in a great measure as judiciously stowed ballast.

That in vessels of war or armed steamers all the essential and vital parts of the machinery will be completely protected from an enemy's fire, and that the acting engineer can perform his duty not only with safety but with that self possession which personal security could alone insure.

Should additional power be required, two cylinders similarly placed on opposite sides of the beam in line with each other might be worked upon the same beam, or one could be doing the work while the other was undergoing repairs, almost essential for vessels navigating the ocean.

In vessels calculated for shallow waters, by the application of the yoke or the bent working beam, any length of stroke may be obtained with the cylinder lying horizontally on the keelson without any loss of power, and with the cylinder thus firmly attached to the keelsons there will be less jar and of course less strain and injury to the vessels than when the cylinder is raised or supported on the deck beams or on a frame at a distance from the keelson.

The arrangements of the essential improvemnets having been described it is thought unnecessary to specify in detail the slight variations which might be required or deemed expedient to be made in the relative situation of its minor parts. Such changes may be made in a variety of ways and would naturally suggest themselves to an engineer or to any person at all skilled or acquainted with the subject upon inspecting or referring to the drawings herewith presented.

In this specification I claim as my original invention, discovery or improvement, 1. Working the beam vertically in combination with the horizontal cylinder.

2. The relative and combined disposition of the cylinder, the beam working vertically, with it and the crank, to wit, the cylinder lying horizontally on or upon the keelson or keelsons at right angles to the lower end of the working beam, while the upper end of said beam is in connection with and gives motion to the crank upon the shaft.

3. The curved or bent working beam, working vertically in combination with the horizontal cylinder in their relative and combined disposition as herein before intended to be described, and as shown in the drafts or drawings accompanying this specification.

4. To avoid bending the working beam in cases in which it is desired to place the shaft lower than on a horizontal level with the upper end of the working beam, I claim the yoke herein before specified in combination and connection with the vertical working beam, working vertically and also in combination with those combined disposition of parts, as set forth and described in the first and second foregoing claims.

All of which together with the drawings and models herewith presented is respectfully submitted.

WILLIAM A. LIGHTHALL.

Signed in the presence of—
 JAMES N. PLATT,
 ALEX. HAMILTON, Jr.,
 HAMILTON MORTON.